Figure 1:
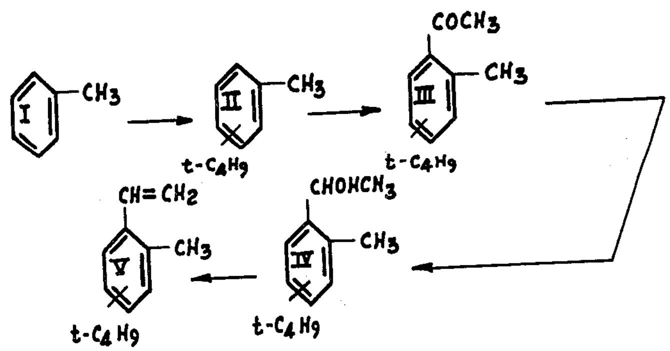

POLYMERS OF METHYL-TERT-BUTYLSTYRENES

Filed March 10, 1959

INVENTORS.
BEN BENNETT CORSON,
WILLIAM J. HEINTZELMAN.
BY
Oscar B. Brumback
their ATTORNEY.

United States Patent Office 3,137,682 Patented June 16, 1964

3,137,682

POLYMERS OF METHYL-TERT-BUTYLSTYRENES

Ben B. Corson and William J. Heintzelman, Pittsburgh, Pa., assignors to Koppers Company, Inc., a corporation of Delaware Filed Mar. 10, 1959, Ser. No. 798,489
5 Claims. (Cl. 260—88.2)

This invention relates to butylvinyltoluene, its polymers, and a process for its preparation. More particularly the invention relates to the novel butylvinyltoluenes, 2-methyl-4-t-butylstyrene and 2-methyl-5-t-butylstyrene, their polymers and copolymers, and a process for their preparation.

Conventional polystyrenes are rigid thermoplastics which are readily formed, as by injection molding, extrusion, compression molding and vacuum forming, into a variety of products for use in an almost endless number of applications. Although these materials are the most versatile of the commercially available plastics, they do have certain physical characteristics which to some extent limit their utility. One of these characteristics is a low heat distortion temperature (heat distortion temperature being that temperature at which a certain specified distortion of the sample occurs under specified testing conditions). The ASTM procedure test D–648–45–T attempts to answer the question "How high a temperature may be applied to a plastic before the material becomes useless for structural applications?" Conventional polystyrenes have heat distortion temperatures of about 165° F. to 190° F.

The low heat distortion temperature of conventional polystyrenes precludes the use of such polystyrenes in any application where it is exposed to temperatures above this heat distortion temperature for any length of time, such as in radio and television cabinets, light fixtures and electronic components. Attempts have been made to copolymerize styrene with other monomers with the hope of imparting to the resulting copolymer a high heat distortion temperature. Monomers found to be particularly suitable are alpha methylstyrene, ortho methylstyrene and acrylonitrile. These monomers, whose respective structures are:

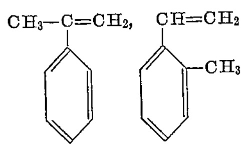

and

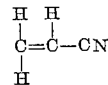

do not appear to have any common characteristics which would cause the improvement in heat distortion characteristics they impart to copolymers of styrene.

Indeed, it has been the experience of those working within the art that no adequate method exists for predicting the effect a particular monomer will have on the heat distortion temperature of the copolymer. In some instances monomers of similar structures will give similar results, while in other instances they do not. The methylstyrene-styrene copolymers are examples of the unpredictable characteristics of copolymers. The ortho-methylstyrene-styrene copolymer has a heat distortion temperature greater than that of styrene, the magnitude of the change in heat distortion temperature being dependent upon the amount of ortho-methylstyrene added; the para-methylstyrene-styrene copolymer has a heat distortion temperature about the same as that of the styrene polymer regardless of the amount of para-methylstyrene added; and the meta-methylstyrene-styrene copolymer has a decreased heat distortion temperature, the decrease depending upon the amount of meta-methylstyrene present. As would be expected, based on the foregoing behavior, the heat distortion temperatures of the homopolymers of these isomers of methylstyrene also vary, the homopolymer of the meta form being 161.6° F., of the para form being 195.8° F., and of the ortho form being 239.0° F. Thus it can be seen that in this instance the effect on heat distortion in the copolymer is related to the heat distortion temperature of the homopolymer. The change in heat distortion temperature is of course proportional to the amount of comonomer added.

It has now surprisingly been found that certain novel vinylbutyltoluenes, 2-methyl-4-t-butylstyrenes and 2-methyl-5-t-butylstyrene, when copolymerized with styrene, yield polymers having this desirable characteristic of high heat distortion temperature.

The magnitude of the improvement in heat distortion temperature of the copolymer is quite surprising when a comparison of the structural formula of the vinylbutyltoluenes, 2-methyl-4 and 5-t-butylstyrenes:

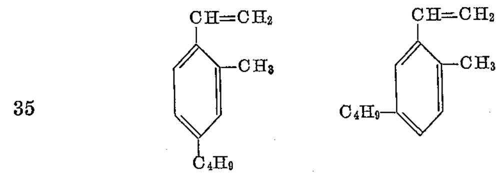

is made with the structural formula of ortho-methylstyrene:

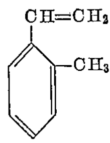

The vinyltoluene monomers of this invention polymerize to homopolymers with heat softening points of 302° F. in contrast to the 239.0° F. for the orthomethylstyrene. That the addition of a t-butyl group could cause such an increase in the heat softening point is indeed surprising and unexpected. The increase in the heat distortion temperature of a styrene-2-methyl-t-butylstyrene copolymer is of an equally amazing and similar magnitude. It is, of course, proportional to the amount of 2-methyl-t-butylstyrene added, but in any event is greatly superior to that imparted by the structurally similar ortho-methylstyrene.

The vinylbutyltoluene monomers of this invention are prepared by a novel process having generally four steps:

(1) The alkylation of toluene to t-butyltoluene.

(2) The acetylation of t-butyltoluene to 2-methyl-t-butylacetophenone.

(3) The hydrogenation of 2-methyl-t-butylacetophenone to 2-methyl-t-butyl-alpha-hydroxyethylbenzene.

(4) The dehydration of 2-methyl-t-butyl-alpha-hydroxyethylbenzene to 2-methyl-t-butylstyrene with the tertiary carbon atom of the butyl group located at either the 4 or 5 position on the phenyl group, depending upon the conditions under which the acetylation is carried out.

Figure 2:
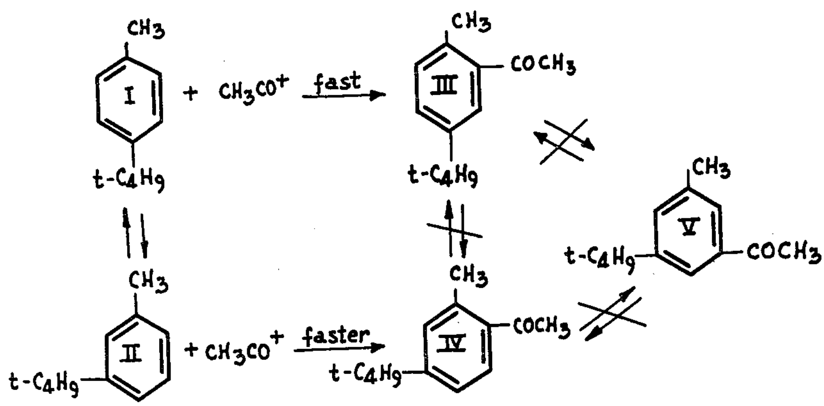

The single sheet drawing illustrates by structural formulas the various steps of the novel process for the manufacture of the monomers of this invention. FIGURE 1 illustrates the overall reaction. FIGURE 2 illustrates the principles of the acetylation reaction.

The novel monomers of this invention have been investigated and the following physical constants of these novel compounds have been determined. For the 2-methyl-5-t-butylstyrene, the boiling point is 103° C. at 10 mm., density $d_4^{25}$ 0.8845, a freezing point of −48.93° C. and a refractive index $n_D^{25}$ 1.5205, while for 2-methyl-4-t-butylstyrene the physical constants are a boiling point of 104° C. at 10 mm., density $d_4^{25}$ 0.8889, a freezing point of −41.74° C. and a refractive index of $n_D^{25}$ 1.5268.

These novel monomers may be polymerized, using known polymerization methods, to form novel polymers of desirable qualities. In addition to their ability to polymerize with styrene to yield novel copolymers of increased heat distortion temperature, these novel monomers impart the same desirable characteristics when polymerized with those ethylenically unsaturated compounds copolymerizable with styrene, to the resulting novel copolymers. Such copolymerized compounds include ortho-chlorostyrene, para-chlorostyrene, 2,6-dichlorostyrene, 2,4-dichlorostyrene, 2,5-dichlorostyrene, 2,3-dichlorostyrene, 3,4-dichlorostyrene, the higher polystyrenes, para-methylstyrene, ortho-methylstyrene, meta-methylstyrene, ethylvinylbenzenes, 4-vinylpyridine, vinylnaphthalene, acrylonitrile, fumaronitrile, maleimide, methyl methacrylate, butyl acrylate, divinylbenzene, isopropenylbenzene, polychloro ring-substituted isopropenylbenzene, para, para-di-isopropenyldiphenyl, para-vinyldiphenyl, methacrylonitrile, acrylic acid, butadiene, isoprene, 1,3-dimethylbutadiene, 2-chlorobutadiene-1,3, vinylidene chloride, etc.

Except for the step acetylation, the steps of the process for production of the novel monomers are carried out in conventional manner. The alkylation, for example, may be accomplished by any of the known methods in the art. The catalysts for this alkylation, when used, are any of the alkylating catalysts, such as sulfuric acid, aluminum chloride, hydrogen fluoride, zinc chloride, boron fluoride, etc.

As is known to those skilled in the art, it is impossible to alkylate toluene using any of the usual alkylating conditions, to get the ortho isomer, because of the steric hindrance imparted by the butyl group. In all cases various mixtures of the meta and para forms result. In the practice of this invention for the preparation of 2-methyl-4-t-butylstyrene, it is not particularly important as for as subsequent operations are concerned as to whether the alkylation produces predominantly one form or the other, since the acetylation can be controlled to give the desired end product. If, however, it is desired to produce 2-methyl-4-t-butylstyrene the alkylating conditions should be chosen so as to yield para-t-butyltoluene.

The key to the synthesis of the individual monomers in accordance with the present invention is the preparation of the proper antecedent ketones. It has been found that by suitable choice of the order of addition of the reagents, the acetylation of p-butyltoluene may be directed to give either 2-methyl-4-t-butylacetophenone or 2- methyl-5-t-butylacetophenone.

Considerable confusion exists in the literaturec oncerning the orientation of the ketones resulting from the aluminum chloride-catalyzed acetylation of certain p-dialkylbenzenes when one or both of the alkyl groups are secondary or tertiary. It has been variously reported that the product is a 2,4-dialkylacetophenone, a 2,5-dialkylacetophenone and a mixture of 2,4- and 2,5-dialkylacetophenones; but these reports have been based on nonquantitative data—the isolation of ketone derivatives often in small yield.

Investigation of the acetylation of p-t-butyltoluene under a variety of conditions has shown that the rate-determining step is the ionization of acetyl chloride and that the rate of acetylation of p-t-butyltoluene is slower than the rate of acetylation of m-t-butyltoluene. It was further found that 2-methyl-4-t-butylacetophenone and 2-methyl-5-t-butylacetophenone result from the acetylation of the corresponding t-butyltoluenes and not from the rearrangement of an isomeric methyl-t-butylacetophenone since neither 2-methyl-4-t-butylacetophenone, 2-methyl-5-t-butylacetophenone nor 3-methyl-5-t-butylacetophenone is isomerized under acetylation conditions. Presumably, the presence of the acetyl group deactivates the benzene ring sufficiently to stabilize the positions of the alkyl groups according to FIGURE 2.

In accordance with the above findings, the acetylation reaction can, depending upon the order of addition of the reactants, be directed to give either 2-methyl-4-t-butylacetophenone or 2-methyl-5-t-butylacetophenone. Thus when the order of addition of reactants restricts the ionization of acetyl chloride and favors the isomerization of p-t-butyltoluene, the composition of the product depends upon the relative rates of acetylation of m- and p-t-butyltoluenes but is 74–97% of 2-methyl-4-t-butylacetophenone. On the other hand, when the order of addition of the reactants favors the ionization of acetyl chloride and restricts the isomerization of p-t-butyltoluene, the product is mainly 2-methyl-5-t-butylacetophenone.

When the mixtures of p-t-butyltoluenes and acetyl chloride were added to suspensions of aluminum chloride in nonpolar solvents, the relatively slow ionization of acetyl chloride allowed the major portion of the p-t-butyltoluene to isomerize to m-t-butyltoluene prior to acetylation with the result that the ketone products contained 74–97% of 2-methyl-4-t-butylacetophenone. Since the equilibrium composition of t-butyltoluene is 67% meta- and 33% para-, it is evident that m-t-butyltoluene acetylates faster than p-t-butyltoluene, for otherwise, the acetylation of p-t-butyltoluene under isomerizing conditions could not produce a ketone mixture containing more than 67% of 2-methyl-4-t-butylacetophenone. This greater reactivity of m-t-butyltoluene is attributed to the combined effects of the hyperconjunction of the methyl group and the induction of the t-butyl group activating the 6 position. As shown by the structural formula below, no position in p-t-butyltoluene is similarly activated; positions 2- and 4- of the m-t-butyltoluene are similarly activated but are relatively sterically hindered.

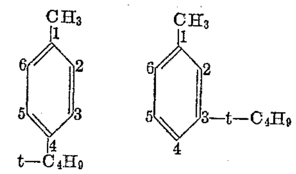

In contrast to this, when the t-butyltoluene is added to the solvent which contains the aluminum chloride, and the acetyl chloride, this order of addition of the reactants favors the ionization of acetyl chloride and restricts the isomerization of p-t-butyltoluene. The product is mainly 2-methyl-5-t-butylacetophenone.

When p-t-butyltoluene was added to a preformed mixture of acetyl chloride and aluminum chloride in a nonpolar solvent, under these conditions of increased $CH_3CO^+$ concentration the rate of acetylation was accelerated with respect to the isomerization of p-t-butyltoluene, with the result that the ketones produced contained 49–71% of 2-methyl-5-t-butylacetophenone. Furthermore, when p-t-butyltoluene was added to mixtures of acetyl chloride and aluminum chloride in a polar solvent the resulting ketone products contained 87–93% of 2-methyl-5-t-butylacetophenone. Thus, the polar solvent aided the ionization of acetyl chloride, thereby increasing the concentration of $CH_3CO^+$ with the result that the rate of acetylation was accelerated. Similarly increasing the $CH_3CO^+$ concentration by using a 2 molar excess of aluminum chloride-acetyl chloride gave a ketone mixture containing 91% of 2-methyl-5-t-butylacetophenone.

In addition to the methyl-t-butylacetophenone in the foregoing process, a certain amount of low-boiling by-product was obtained, which was found to be a mixture of p-methylacetophenone t-butyltoluene and mesityl oxide. Evidently a portion of the t-butyltoluene is debutylated to toluene and isobutylene, both of which then react with acetyl chloride to give respectively p-methylacetophenone and 4-chloro-4-methyl-2-pentanone. The latter is subsequently dehydrohalogenated to mesityl oxide. These reactions are illustrated by the following equation.

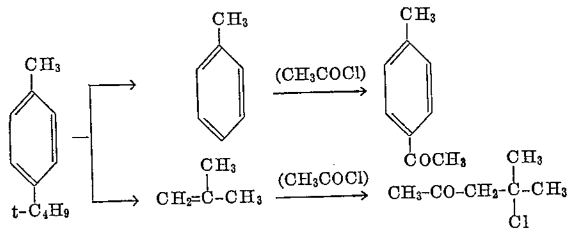

These products do not affect other reactions.

The hydrogenation step is carried out in a suitable pressure resistant apparatus. Any of several catalysts in addition to copper chromite may be used. Such catalysts are copper oxide, chrome oxide, platinum, palladium, Raney nickel, etc. Any of the common processes may be used.

The dehydration step, which is conventional, may be carried out over any of the known catalysts such as kaolin, alumina, aluminum oxide, sulfuric acid, etc.

To further illustrate the invention the following examples are given by way of illustration and not by way of limitation.

EXAMPLE I

*Alkylation.*—Over a period of three hours, ten moles (560 grams) of isobutylene was passed into a stirred mixture of 10 moles (920 grams) of toluene and 100 cc. of concentrated sulfuric acid, and the mixture maintained at a temperature in the range of from 0–10° C. After the addition was completed, the mixture was stirred for 1 hour at 0–10° C. The hydrocarbon layer was separated and washed with water. The hydrocarbon was refluxed for 1 hour with 300 cc. of 20% aqueous sodium hydroxide, then dried over anhydrous magnesium sulfate and washed again with water and dried. The dried hydrocarbon was distilled through a 23 plate column at 5/1 reflux ratio to give 1129 grams, a 76% yield, of t-butyltoluene; B.P. 185–195° C./750 mm., o-m-p ratio 0–5–95.

The subsequent steps depend for final product upon the conditions of acetylation and for this reason are considered as series A and B.

*Acetylation A.*—To a stirred mixture of 2000 cc. of carbon tetrachloride and 510 grams (3.8 mol) of anhydrous aluminum chloride at a temperature of 25–30° C. was added a mixture of 310 grams (3.9 mol) of acetyl chloride and 510 grams (3.5 mol) of t-butyltoluene over a period of eight hours. After the addition was complete, the stirring was continued for one hour, and the resulting product was poured onto crushed ice. The organic layer was separated from the aqueous layer. Organic matter from the aqueous layer was extracted with two washings of carbon tetrachloride. The organic layer, plus the carbon tetrachloride extract from the aqueous phase, was washed successively with water, a 5% solution of sodium carbonate, and water. The carbon tetrachloride was distilled from the organic layer, and the residue subjected to steam distillation. The organic layers of the steam distillate and the residue were combined and distilled using a 23 plate column and a 5/1 reflux ratio. That portion coming off as overhead in the range of 140–150° C. at 20 mm. was collected and identified as 2-methyl-4-t-butylacetophenone. The yield was found to be 42%. The 2-methyl-4-t-butylacetophenone was crystallized from methanol six times at −30° C., then distilled. The product had a freezing temperature of 11.83° C. and was 98.6–99.3 mol percent pure.

*Acetylation B.*—To a stirred, 0–10° C. slurry of 2000 cc. of carbon tetrachloride and 510 grams (3.8 mol) of anhydrous aluminum chloride was added 310 grams (3.9 mol) of acetyl chloride during 0.5 hour. After stirring for one hour, 510 grams (3.5 mol) of t-butyltoluene was added during two hours. The mixture was stirred for one hour, then poured into a mixture of 400 cc. of concentrated hydrochloric acid and 2000 grams of ice. The carbon tetrachloride layer was decanted. The aqueous phase was extracted with carbon tetrachloride. The carbon tetrachloride layer, plus the carbon tetrachloride extract of the aqueous phase, was washed successfully with water, 5% sodium carbonate and water. After drying over anhydrous magnesium sulfate, the carbon tetrachloride was distilled off and the residue was washed with 5% sodium carbonate and then distilled, using a 23 plate column and 5/1 reflux ratio. That portion boiling in the range of 140–150° C. at 20 mm. was collected, and identified as 2-methyl-5-t-butylacetophenone. The yield was 64%.

As has been pointed out above the order of addition of the reactants determines the position of acetyl group alkylation. When, as in Acetylation A, the acetyl chloride and t-butyltoluene are mixed prior to their addition to the solvent, and aluminum chloride, the resulting product is 2-methyl-4-t-butylacetophenone. In contrast to this, when, as in Acetylation B, the t-butyltoluene is added to the solvent which contains the aluminum chloride, and acetyl chloride, the resulting product is 2-methyl-5-t-butylacetophenone.

*Hydrogenation A.*—A mixture of 667 grams (3.5 mol) of the 2-methyl-4-t-butylacetophenone and 20 grams of copper chromite was shaken at 135° C. under 1400 p.s.i. of hydrogen. The pressure drop was 800 p.s.i. in 40 minutes. The product was cooled and then filtered and distilled, and that portion boiling at 157–158° C. at 20 mm. pressure was collected to give 641 grams (95% yield) of 2-methyl-4-t-butyl-α-hydroxyethylbenzene.

$$(d_4^{25}\ 0.9539,\ n_D^{25}\ 1.5160)$$

*Hydrogenation B.*—A mixture of 1053 grams (5.6 mol) of the 2-methyl-5-t-butylacetophenone and 30 grams of copper chromite was shaken at 135° C. under 1500 p.s.i. of hydrogen. After a pressure drop of 1000 p.s.i. the product was cooled, filtered and the filtrate distilled. That portion boiling at 134–140° C. at 10 mm. pressure was collected to give 884 grams (90% yield) of 2-methyl-5-t-butyl-α-hydroxyethylbenzene.

Hydrogenations A and B illustrate the hydrogenation of the respective acetophenones to the 2-methyl-t-butyl-α-hydroxyethylbenzenes.

*Dehydration A.*—There is passed 625 grams (3.3 mol) of 2-methyl-4-t-butyl-α-hydroxyethylbenzene over alumina at a temperature of 300° C. and at atmospheric pressure at 1 liquid hourly space velocity. The catalyzate was collected in an ice-cooled receiver containing 3 grams of tertiary butyl catechol, a well known polymerization inhibitor. After separating 50 cc. (2.8 mol) of water, the product was distilled in a 27 plate column at a 10/1 reflux ratio, to give 373 grams (66% yield) of 2-methyl-4-t-butylstyrene; (96.7–98.4 mol percent pure, F.T. −42.45° C.).

*Dehydration B.*—A solution of 900 grams (4.7 mol) of 2-methyl-5-t-butyl-α-hydroxyethylbenzene in 510 cc. of methanol was passed over activated alumina at 350° C., at atmospheric pressure and 1.8 liquid hourly space velocity. The catalyzate, collected in an ice-cooled receiver containing 10 grams of tertiary butyl catechol, was poured into water and the organic layer was separated and distilled in 4 batches to give 648 grams (80% yield) of 2-methyl-5-t-butylstyrene (F.T. —49.13° C., 94.5–97.5 mol percent pure).

The process is not confined to the preparation of the individual monomers, but is equally applicable to the preparation of mixtures thereof. That is, the process above may be carried out under the same conditions using mixtures of the respective isomers, rather than the pure isomers.

EXAMPLE II

A 20 gram portion of the 2-methyl-4-t-butylstyrene was polymerized in bulk by sealing the material in a glass test tube which was immersed in a bath whose temperature for the first 14 hours was maintained at 90° C., and for a subsequent 8 hours was maintained at 115° C. Thereafter, the tube was removed from the bath and air cooled. The material was found to be a clear transparent solid. In order to remove any residual monomer the polymer was dissolved in toluene and the resulting solution was added to sufficient methanol to precipitate the polymer. The polymer is then recovered by filtration. The Vicat softening point was determined by ASTM method D–648–45–T and found to be 297° F.

The Vicat softening point was determined by placing the specimen in an air oven heated to 30° C. This temperature is held for 10 minutes and then is raised at the rate of 50° C. per hour. The end of a flat ended needle loaded to 5,000 grams per square mm. is held in contact with the specimen. The temperature at which the needle penetrates the specimen 1 mm. is reported as the Vicat softening point.

EXAMPLE III

The procedure of Example II was repeated using 2-methyl-5-t-butylstyrene. A clear, hard polymer resulted. The Vicat softening point in this instance was also found to be 297° F.

EXAMPLE IV

Example II was repeated using equal molar portions of 2-methyl-4-t-butylstyrene and the 2-methyl-5-t-butylstyrene. A similar polymer was obtained. The Vicat softening point of this mixture was determined and also found to be 297° F.

These examples illustrate that the Vicat temperatures of both isomers and the mixture are the same.

EXAMPLE V

A series of styrene-2-methyl-4-t-butylstyrene copolymers were prepared in suspension by charging into a three-necked one liter flask, 200 parts of water, 0–20 parts benzoyl peroxide, 0.02 part of Purmat LA, a commercially available tertbutyl perbenzoate, 0.03 part Naccanol NRSF, a commercially available sodium dodecylbenzene, 0.01 part Elvanol 50–42, a commercially available polyvinyl alcohol containing a small amount of polyvinyl acetate, 0.25 part sodium nitrate and 100 parts of monomers of varying compositions as set out in the table below. The polymerization was conducted under a nitrogen atmosphere with stirring. A temperature of 90° C. was maintained for 14 hours and then a temperature of 115° C. for 8 hours. On completion of polymerization, the reaction solution was acidified to a pH of 2 with hydrochloric acid and then filtered to recover the polymer which was washed with water until a negative reaction to the silver nitrate test was obtained. The polymer was then dissolved in benzene and the resulting solution added to sufficient methanol to precipitate the polymer, which is recovered by filtration.

*Physical Test Data for Alkyl and Alkenyl Substituted Vinyl Polymers and Copolymers*

| Run | Styrene, Parts | 2-methyl-4-t-butylstyrene, Parts | Inherent Viscosity | Tensile Strength (p.s.i.) ASTM D-638-52T | Heat Distortion temperature (° F.) ASTM D-648-45T |
|---|---|---|---|---|---|
| 1 | 90 | 10 | 0.725 | 7865 | 209.0 |
| 2 | 75 | 25 | 0.580 | 5480 | 210.7 |
| 3 | 50 | 50 | 0.668 | 5890 | 222.0 |
| 4 | 25 | 75 | 0.639 | Not Determined | 222.0 |

An inspection of these results indicates that there is almost a linear relationship between the amount of 2-methyl-4-t-butylstyrene used and the heat distortion temperature.

EXAMPLE VI

Example V was repeated using 2-methyl-5-t-butylstyrene. Substantially similar results were obtained.

EXAMPLE VII

Example V was repeated using mixtures of 2-methyl-5-t-butylstyrene and 2-methyl-4-t-butylstyrene. Substantially similar results were obtained.

EXAMPLE VIII

A comonomer of 77 parts of an equimolar charge of the 2-methyl-4-t-butylstyrene and 2-methyl-5-t-butylstyrene and 23 parts of acrylonitrile was prepared by a suspension polymerization system. The monomer charge, together with 0.21 part benzoyl peroxide, was charged to 200 parts of water. This mixture was polymerized for two hours at 80° C. The rate conversion was found to be 74.6. The material was determined to have a relative viscosity of 2.06 and a Vicat softening point of 268° F.

A comparison of the properties of polystyrene and copolymers of 2-methyl-4-t-butylstyrene and styrene show that the copolymer has about the same properties as styrene, except the heat distortion temperature, which is considerable higher. The properties are set out below.

| Styrene-2-methyl-4-t-butylstyrene copolymer | Tensile | Tensile Elastic Modulus | Elongation | Heat Distortion Temperature |
|---|---|---|---|---|
| 90–10 | 8,000 | 397 | 2.5 | 210 |
| 80–20 | 8,530 | 414 | 3.2 | 211 |
| Polystyrene | 8,000–8,800 | 375–475 | 2.5 | 190–195 |

The above properties indicate that these new copolymers may be used in a variety of applications where polystyrene was unfitted because of its lower heat distortion temperature. These applications particularly include radio cabinets and electrical connections.

We claim:

1. The homopolymer of a substituted orthovinyltoluene wherein the only substitution being that a hydrogen atom of the phenyl group at least two positions removed from both the methyl and vinyl groups is replaced by a tertiary butyl group said homopolymer having a heat distortion temperature as determined by ASTM test procedure D–648–45–T of 302° F. and having a Vicat softening point of about 297° F.

2. The homopolymer of 2-methyl-4-tert-butylstyrene said homopolymer having a heat distortion temperature as determined by ASTM test procedure D–648–45–T of 302° F. and having a Vicat softening point of about 297° F.

3. The homopolymer of 2-methyl-5-tert-butylstyrene said homopolymer having a heat distortion temperature as determined by ASTM test procedure D-648-45-T of 302° F. and having a Vicat softening point of about 297° F.

4. A copolymer consisting essentially of 2-methyl-5-tert-butylstyrene and 2-methyl-4-tert-butylstyrene said copolymer having a Vicat softening point of about 297° F.

5. A copolymer consisting essentially of 90-25 percent by weight of styrene and 10-75 percent by weight of 2-methyl-4-t-butylstyrene, said copolymer having a heat distortion temperature as determined by ASTM test procedure D-648-45-T of 209-222° F.

References Cited in the file of this patent

UNITED STATES PATENTS

| | | |
|---|---|---|
| 2,555,298 | Sturrock et al. | May 29, 1951 |
| 2,723,261 | Levine et al. | Nov. 8, 1955 |
| 2,776,921 | Melamed | Jan. 8, 1957 |
| 2,802,812 | Overberger | Aug. 13, 1957 |
| 2,911,391 | Vandenberg | Nov. 3, 1959 |
| 2,987,508 | Ruffing et al. | June 6, 1961 |

OTHER REFERENCES

Thomas: Anhydrous Aluminum Chloride (1941), Reinhold Publishing Corp., New York, N.Y., pages 218-221.